(12) United States Patent
Forbes et al.

(10) Patent No.: US 6,429,632 B1
(45) Date of Patent: Aug. 6, 2002

(54) EFFICIENT CMOS DC-DC CONVERTERS BASED ON SWITCHED CAPACITOR POWER SUPPLIES WITH INDUCTIVE CURRENT LIMITERS

(75) Inventors: Leonard Forbes, Corvallis, OR (US); Kie Y. Ahn, Chappaqua, NY (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 09/502,827

(22) Filed: Feb. 11, 2000

(51) Int. Cl.[7] .............................. G05F 1/40; H02M 3/18
(52) U.S. Cl. ........................................ 323/282; 363/59
(58) Field of Search ................. 323/282, 272, 323/222; 363/59, 60, 21

(56) References Cited

U.S. PATENT DOCUMENTS

| | | | | |
|---|---|---|---|---|
| 4,636,930 A | * | 1/1987 | Bingham et al. | 363/60 |
| 4,999,761 A | | 3/1991 | Bingham et al. | |
| 5,396,527 A | * | 3/1995 | Schlecht et al. | 327/530 |
| 5,400,235 A | | 3/1995 | Carroll | |
| 5,485,365 A | * | 1/1996 | Dan-Harry | 363/132 |
| 5,680,300 A | | 10/1997 | Szepesi et al. | |
| 5,736,842 A | * | 4/1998 | Jovanovic | 323/222 |
| 5,751,561 A | * | 5/1998 | Ho et al. | 363/21.1 |
| 5,966,298 A | * | 10/1999 | Fischer | 363/59 |

OTHER PUBLICATIONS

Moore; "Regulator topologies standardize battery powered systems"; Electronic Design News (European Edition); vol. 39, No. 2, pp. 59–64, Jan., 20, 1994.

Sherman; "DC–DC conversion techniques for noise–sensitive applications"; Electronic Design, vol. 45, Nov. 17, 1997, 7 total pages.

Mino et al.; "A Compact Buck–Converter Using a ThinFilm Inductor"; IEEE Power Electronics Conference and Expo., vol. 1, Part 1, Mar. 1996, pp. 422–426.

Mino et al.; "Switching Converter Using Thin–Film Microtransformer with Monolithically Integrated Rectifier Diodes"; IEICE Trans. Electron., vol. E80–C, No. 6, Jun. 1997; pp. 821–827.

Matsumoto et al.; "Integration of a Power Supply for System–on–Chip"; IEICE Trans. Fundamentals, vol. E80–A, No. 2, Feb. 1997, pp. 276–282.

Moore; "Buck Regulator Answers Portable Challenges"; Electronic Design, vol. 46, No. 20, Sep. 1, 1998; pp. 128–134.

(List continued on next page.)

Primary Examiner—Rajnikant B. Patel
(74) Attorney, Agent, or Firm—Dickstein Shapiro Morin & Oshinsky, LLP

(57) ABSTRACT

A novel class of DC to DC power converters and a method of conversion is provided using high-frequency switched capacitors where the switches are implemented by CMOS transistors or diodes on an integrated-circuit chip and using inductors to limit charging current. High efficiency is achieved using inductors to reduce energy losses in circuit capacitors by high frequency switching when inductor current is zero and capacitor voltage is maximized. The high-frequency (100 MHz or greater) operation of the converter circuit permits the use of inductors with a low inductance value on the order of 100 nH ($100 \times 10^{-9}$ Henrys) capable of fabrication directly on an integrated-circuit (IC) chip. The use of CMOS integrated components allows the entire converter to be formed on a single IC chip, saving significant space within the portable system. Output voltage and current is high enough to permit EEPROM programming. In addition, fluctuations in the output voltage (ripple voltage) are substantially eliminated when several of the converter circuits are used in parallel.

108 Claims, 12 Drawing Sheets

OTHER PUBLICATIONS

Acik et al.; "Active Clamped ZVS Forward Converter with Soft–Switched Synchronous Rectifier for Maximum Efficiency Operation"; Proc. of $29^{th}$ Annual IEEE Power Electronics Specialists Conference, Cat. No. 98CH36196, vol. 2, pp. 1237–1242, 1998, No date.

Dias et al.; "An Improved Self–Resonant PWM Forward Converter"; Proc of $13^{th}$ Annual Power Electronics Conference and Exposition, vol. 2, pp. 620–625, 1998, No Date.

Xi et al.; "A Zero Voltage Switching Forward Converter Topology"; Proc. of $19^{th}$ International Telecommunications Energy Conference, 1997, pp. 116–123, No Date.

Kim et al.; "An Improved Soft Switching Forward DC/DC Converter Using Energy Recovery Snubber"; Proc. of $19^{th}$ International Telecommunications Energy Conference, 1997, pp. 46–49, No date.

Sun et al.; "Forward Converter Regulator Using PWM Controlled Transformer"; Proc. of the IEEE Power Electronics Specialists Conference, 1993, pp. 1116–1122, No Date.

Djekic et al.; "High Frequency Synchronous Buck Converter for Low Voltage Applications", Proc. of $29^{th}$ Annual IEEE Power Electronics Specialists Conference, 1998, pp. 1248–1254, No date.

Tsukamoto et al.; "A Highly Efficient Buck Converter with Double–Anti–Crossover Synchronous Rectification Using a Newly Developed Control IC"; Proc. of $29^{th}$ Annual IEEE Power Electronics Specialists Conference, 1998, pp. 1243–1247, No Date.

Matsuo et al.; "A Novel Soft–Switching Buck–Boost Type AC–DC Converter with High Power Efficiency, High Power Factor and Low Harmonic Distortion"; Proc. of $29^{th}$ Annual IEEE Power Electronics Specialists Conference, vol. 2, 1998, pp. 1030–1035, No Date.

Berkovici et al.; "High Efficient PWM Zero–Voltage–Transition DC–DC Boost Converter"; Proc. of the 1998 IEEE International Symposium on Circuit and Systems, vol. 6, 1998, pp. 442–445, No date.

Shoyama et al.; "Voltage Resonant Buck–Boost Converter Using Multi–Layer–Winding Transformer"; Record of $20^{th}$ Annual IEEE Power Electronics Specialists Conference, vol. 2, 1989, pp. 895–901, No date.

Martino et al.; "An On–Chip Back–Bias Generator for MOS Dynamic Memory"; IEEE Journal of Solid–State Circuits, vol. SC–15, No. 5, Oct. 1980, pp. 820–826.

Gillingham; "High Speed Charge–Pump"; IBM Technical Disclosure Bulletin, vol. 27, No. 29, Feb. 1985, pp. 5407–5409.

Tanzawa et al.; "A Quick Boosting Charge Pump Circuit for High Density and Low Voltage Flash Memories", 1994 Symposium on VLSI Circuits Digest of Technical Papers, pp. 65 and 66, No Date.

Monna, et al, "Charge Pump For Optimal Dynamic Range Filters", Proc. of 1994 IEEE Int. Symposium on Circuits and Systems, vol. 5, pp. 747–750, 1994, No Date.

Wang, et al, "Efficiency Improvement In Charge Pump Circuits", IEEE Journal of Solid–State Circuits, vol. 32, No. 6, pp. 852–860, 1997, No Date.

Favrat, et al, "A New High Efficiency CMOS Voltage Doubler", Proc. Of the IEEE 1997 Custom Integrated Circuits Conference, pp. 259–262, 1997, No Date.

Favrat, et al., "A High–Efficiency CMOS Voltage Doubler", IEEE J. Solid–State Circuits, vol. 33, No. 3, pp. 410–416, Mar. 1998.

Yoon, et al, "Charge pump boosting technique for power noise immune high–speed PLL implementation", Electronics Letters, vol. 34, No. 15, pp. 1445–1446, Jul. 1998.

* cited by examiner

EFFICIENT CMOS DC-DC CONVERTERS BASED ON SWITCHED CAPACITOR POWER SUPPLIES WITH INDUCTIVE CURRENT LIMITERS

BACKGROUND OF THE INVENTION

1. Field of the Invention

The present invention relates to the field of electronic systems which require power at more than one voltage, and more particularly, to a DC to DC power converter utilizing switched capacitors and inductive current limiters to achieve high efficiency.

2. Description of the Related Art

The evolution of electronic devices from analog to digital circuitry has changed the power supply requirements for circuit components. Yesterday's analog systems typically required a multitude of supply voltages, whereas today's digital systems typically use power at only a few standard voltages such as +/−5V or 3.3V. By reducing the number of supply voltages required, system designs benefit through lower cost, lighter weight, reduced volume and higher reliability due to the reduction in the number of power supply components.

In spite of this evolution in electronics, there are still a significant number of systems which require power at voltages in addition to the standard digital 5V or 3.3V levels. For example, systems which include data communication circuits often require negative voltages for compatibility with the Electronic Industries Association (ELA) RS232C interface, a popular interface for data communications, which requires voltage levels ranging from −25V to +25V. Furthermore, preamplifiers, required for many interfacing applications, often require a negative supply voltage in addition to a positive supply voltage which is greater than the standard digital voltage of 5V.

In order to satisfy the need for several different supply voltages in digital systems, DC to DC power converters are used to produce output voltages different from the standard input voltage. These converters are available in step-down configurations that reduce the voltage relative to the input, step-up configurations that increase the voltage relative to the input, and inverter configurations that reverse the polarity of the input voltage (e.g. +5V input results in −5V output) and may be combined with either step-up or step-down configurations.

For computer system applications, DC to DC converters often operate in a low voltage, high-frequency switched environment. The explosive growth in the field of portable electronic devices, such as portable telephones, radio pagers, and notebook computers, has created a need for DC to DC converters which consume a minimum amount of power and take up as little space in the device as possible. Because batteries are the main power source for these portable devices, low-voltage circuitry is used to reduce power consumption and extend battery life. Battery energy is further saved by using a distributed power supply system with a switched controller which turns the individual converters on and off as they are needed.

Additional advantages with distributed systems can be achieved using controllers and converters which operate at a high frequency. Miniaturized electronics which typically operate at frequencies in the range of 100 MHz or more, such as semiconductor integrated-circuit devices, save significant amounts of space and weight in portable systems. These devices also can operate at low voltage and power consumption levels. In addition, improved thermal management and higher power densities as compared to conventional electronics makes integrated-circuit devices a natural choice for portable systems.

One circuit element frequently used in DC to DC converters is the inductor. Inductors are commonly used in the forward, buck (step-down) and boost (step-up) converters shown in FIGS. 1(a), 1(b) and 1(c), respectively (discussed below in more detail). Because conventional converters require inductors with an inductive value on the order of 1 micro-Henry ($1 \times 10^{-6}$ H), the inductor used is typically bulky and expensive, and is attached externally to the semiconductor chip which contains the remainder of the converter circuit. Inductors capable of integration on a semiconductor chip are available, but only for lower inductance values. Therefore, there is a need for converter circuits that use low-inductance-value integrated inductors permitting inclusion of all converter components in a single semiconductor chip.

Another common approach for producing additional voltages, that is particularly suited for low-power applications, is the "charge pump" or "flying capacitor" voltage converter. Referring to FIG. 2, an inverting charge pump 50 operates by charging a "pump" capacitor 58 during a clock's first half-cycle, or "pumping phase," to the level of a source voltage 54 via amplifier 56. During the clock's second, non-overlapping half-cycle, or "transfer phase," the pump capacitor 58 is disconnected from the source 54 and connected, with its polarity switched, to a second "reservoir" capacitor 68, thereby "pumping" charge to the reservoir capacitor 68 and providing an output $V_{BB}$ which is approximately the negative of the input voltage.

With a minor rearrangement of the pump's switching elements, a step-up converter is produced. During the clock's first half-cycle the pump capacitor is charged to the level of the source voltage. During the clock's second half-cycle, the pump capacitor's positive side is disconnected from the source, and its negative side, which had been connected to ground during the first half-cycle, is connected to the source. The positive side, now at twice the source voltage, is connected to the reservoir capacitor, thus charging it to twice the source voltage. This 'doubled' voltage at the reservoir capacitor is then used as a power supply to components requiring the doubled voltage.

Charge pumps are limited in their voltage ranges and ability to supply large currents. Large currents are required to reprogram electrically-erasable programmable read-only memory (EEPROM) arrays, making charge pumps unsuitable for these increasingly popular devices. Conventional forward, buck, and boost converters require large-inductance inductors and/or transformers which are difficult or impossible to fabricate on integrated circuits, increasing the size of the converter.

In addition to size, current and voltage ranges, efficiency is also an important aspect of DC to DC converter performance. All DC to DC converters will dissipate a portion of the input energy in the circuit components, for example some energy is dissipated as heat in each resistor. Greater component losses result in reduced efficiency of the converter. In general, greater current magnitudes over time in the circuit result in greater losses in circuit components and hence lesser efficiency. Also, the use of multiple clocks for switching transistors also dissipates energy and reduces efficiency.

Therefore, there is a desire and need for efficient DC to DC converters suitable for use in small portable electronic systems which operate at high frequency and are capable of producing a current output sufficient for EEPROM programming and a range of voltages sufficient to meet various system requirements.

SUMMARY OF THE INVENTION

The present invention provides a novel class of DC to DC converters based on switched capacitors suitable for use in portable electronic devices that offers improved efficiency, smaller size, and other advantages over conventional converters.

The above and other features and advantages of the invention are achieved by providing a DC to DC power converter circuit using switched capacitors where the switches are implemented by CMOS transistors or diodes on an integrated-circuit chip and using inductors to limit charging currents. The inductors can be fabricated directly on the CMOS integrated circuit or alternatively could be small inductors incorporated in the packaging. The high-frequency operation (100 MHz or greater) of the converter circuit permits the use of inductors with a low inductance value on the order of 100 nH ($100 \times 10^{-9}$ Henrys) capable of fabrication directly on an integrated-circuit (IC) chip. The use of CMOS integrated components allows the entire converter to be formed on a single IC chip, saving significant space within the portable system.

Although the limit on charging current imposed by the inductor improves the efficiency of the converter by avoiding certain energy losses in the charging capacitor, the output current of the converter is not so limited as in prior designs, allowing the provision of a high output current for EEPROM reprogramming.

The present invention also provides reduced fluctuations in the power supply output voltage (ripple voltage) when several circuits are used in parallel to charge a single capacitor.

Furthermore, an embodiment of the present invention allows some transistor switches to be replaced with diodes to simplify the circuit and improve efficiency by removing the necessity for multiple switching clocks.

BRIEF DESCRIPTION OF THE DRAWINGS

The foregoing and other advantages and features of the invention will become more apparent from the detailed description of the preferred embodiments of the invention given below with reference to the accompanying drawings in which.

DETAILED DESCRIPTION OF PREFERRED EMBODIMENTS

The terms "wafer" and "substrate" are used interchangeably and are to be understood as including silicon, silicon-on-insulator (SOI) or silicon-on-sapphire (SOS) technology, doped and undoped semiconductors, epitaxial layers of silicon supported by a base semiconductor foundation, and other semiconductor structures. Furthermore, when reference is made to a "wafer" or "substrate" in the following description, previous process steps may have been utilized to form regions or junctions in the base semiconductor structure or foundation. While the embodiments described herein are generally directed toward a +5V or lower input digital system based on one micron ($1 \times 10^{-6}$ meters) technology, the inventive concepts are equally applicable to integrated circuit technologies with other dimensions and power supply voltages.

Figure 1A:
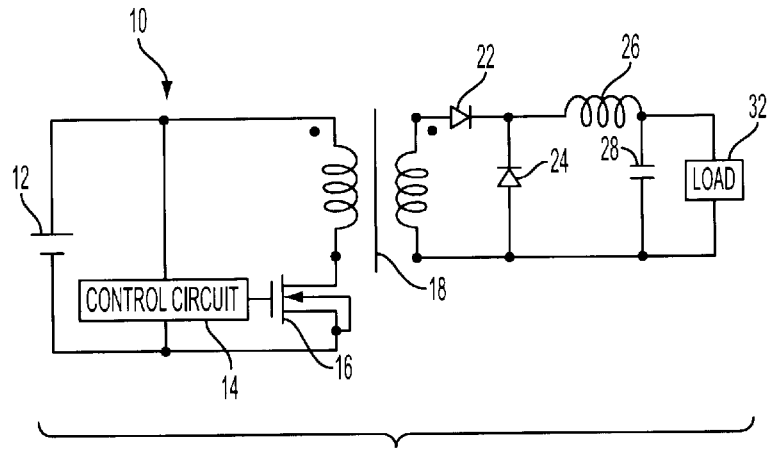
FIG. 1(a) shows a schematic diagram of a prior art single-ended forward converter.
Figure 1B:
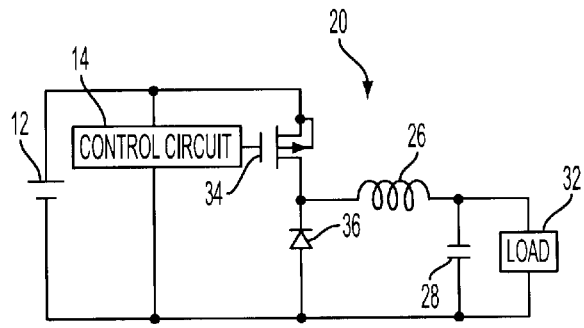
FIG. 1(b) shows a schematic diagram of a prior art buck (step-down) converter circuit.
Figure 1C:
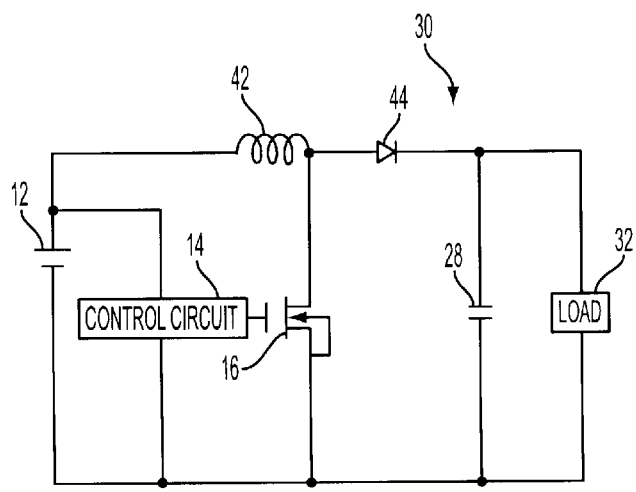
FIG. 1(c) shows a schematic diagram of a prior art boost (step-up) converter circuit.

FIGS. 1(a)–(c) illustrate three types of typical DC to DC power supply converters used in electronic devices as a source of DC power. FIG. 1(a) shows a single ended forward converter 10 in which the input DC power 12 is chopped by a control circuit 14 at a control transistor 16 to form a series of DC pulses which can be stepped up or down using a transformer 18 and then rectified by first and second rectifiers 22 and 24. An inductor 26 and capacitor 28 are used to smooth out ripples in the output voltage, which is used to power a load 32.

FIG. 1(b) shows a typical buck converter 20. A control transistor 34 is in series with the load 32 and the input voltage can only be stepped down. The control circuit 14 and the control transistor 34 chop the input DC power 12, and the chopped voltage is filtered by inductor 26, which operates as a choke, and capacitor 28. The diode 36 clamps the chopped voltage to maintain positive polarity.

FIG. 1(c) shows a typical boost converter 30. A control transistor 16 is connected to the input DC power 12 with an inductor 42, and when the input voltage is chopped by the control circuit 14, an alternating flyback voltage is generated. This flyback voltage is higher than the input voltage when rectified by diode 44 and filtered by the capacitor 28. This boost converter 30 can only step up the output voltage to power the load 32.

Figure 2:
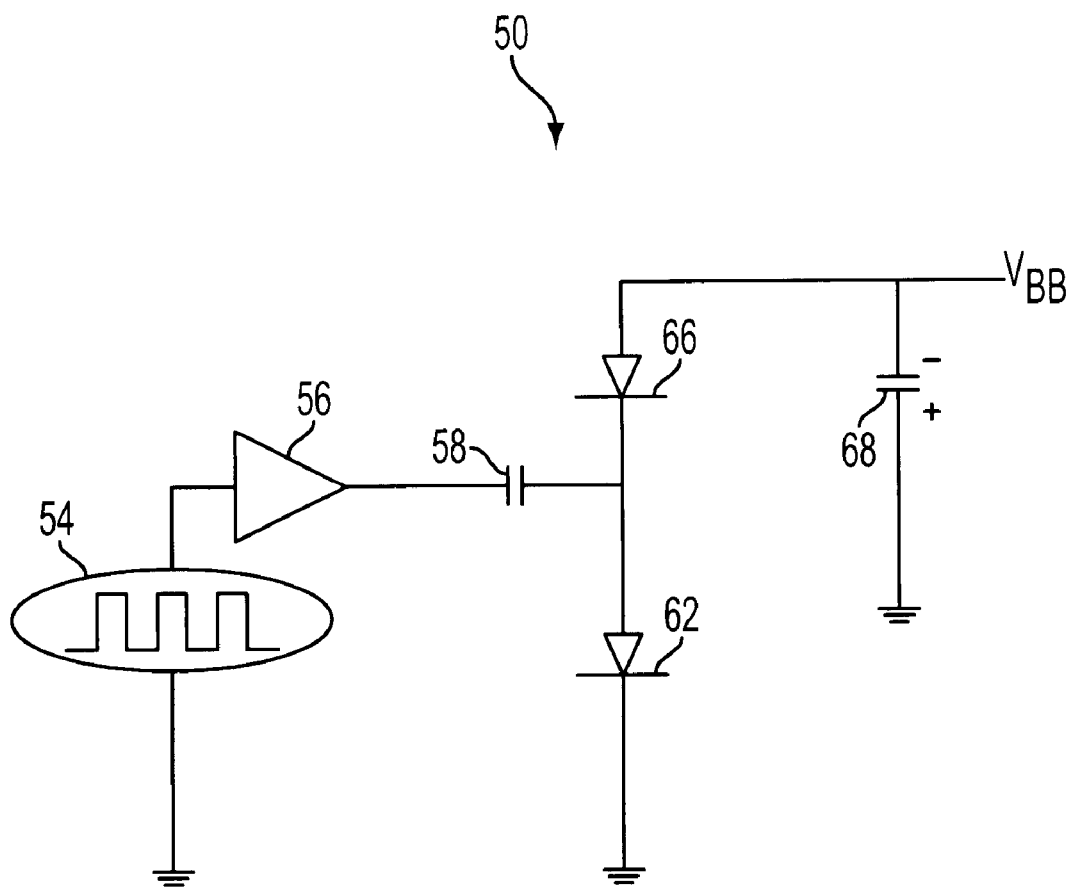
FIG. 2 shows a schematic diagram of a prior art charge pump circuit.
Figure 3A:
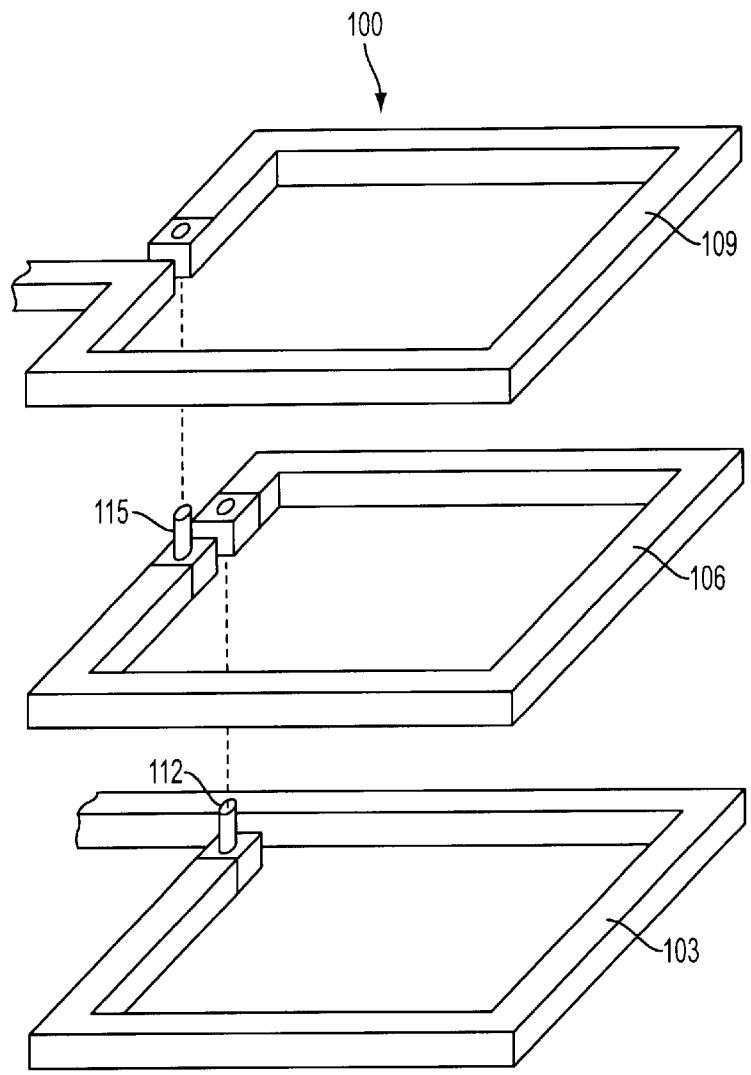
FIG. 3(a) illustrates an exploded perspective view of an integrated circuit solenoidal inductor which may be used in the present invention.
Figure 3B:
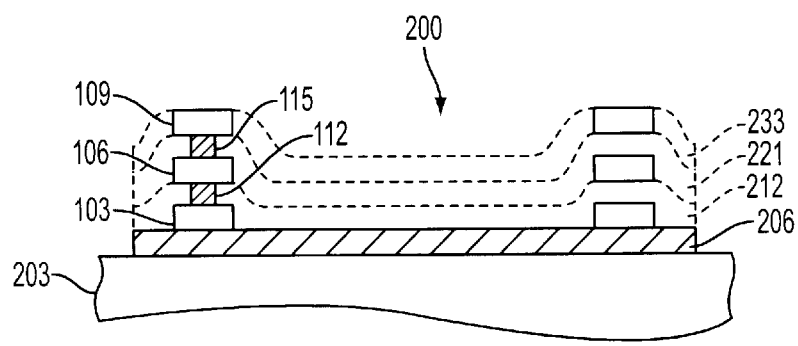
FIG. 3(b) illustrates a fragmentary vertical cross-sectional view of the integrated circuit solenoidal inductor of FIG. 3(a)
Figure 3C:
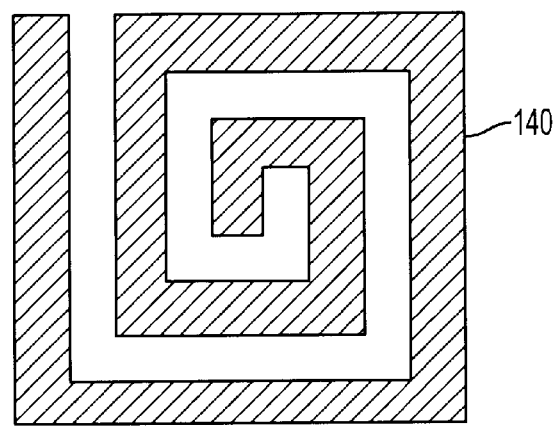
FIG. 3(c) illustrates a top view of an integrated circuit spiral inductor which may be used in the present invention.
Figure 3D:
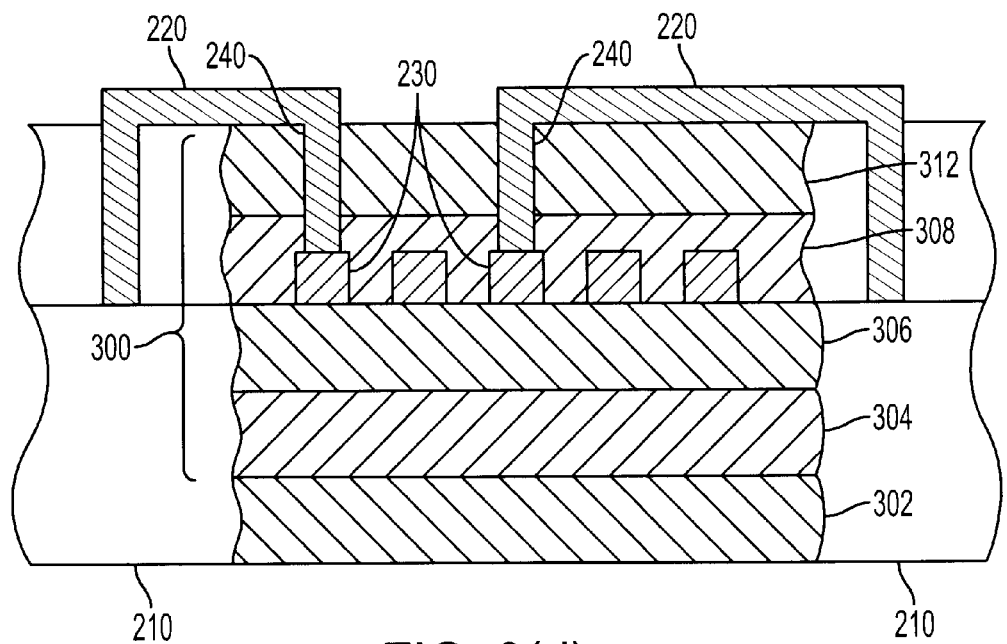
FIG. 3(d) illustrates a fragmentary vertical cross-sectional view of the integrated circuit spiral inductor of FIG. 3(c)
Figure 3E:
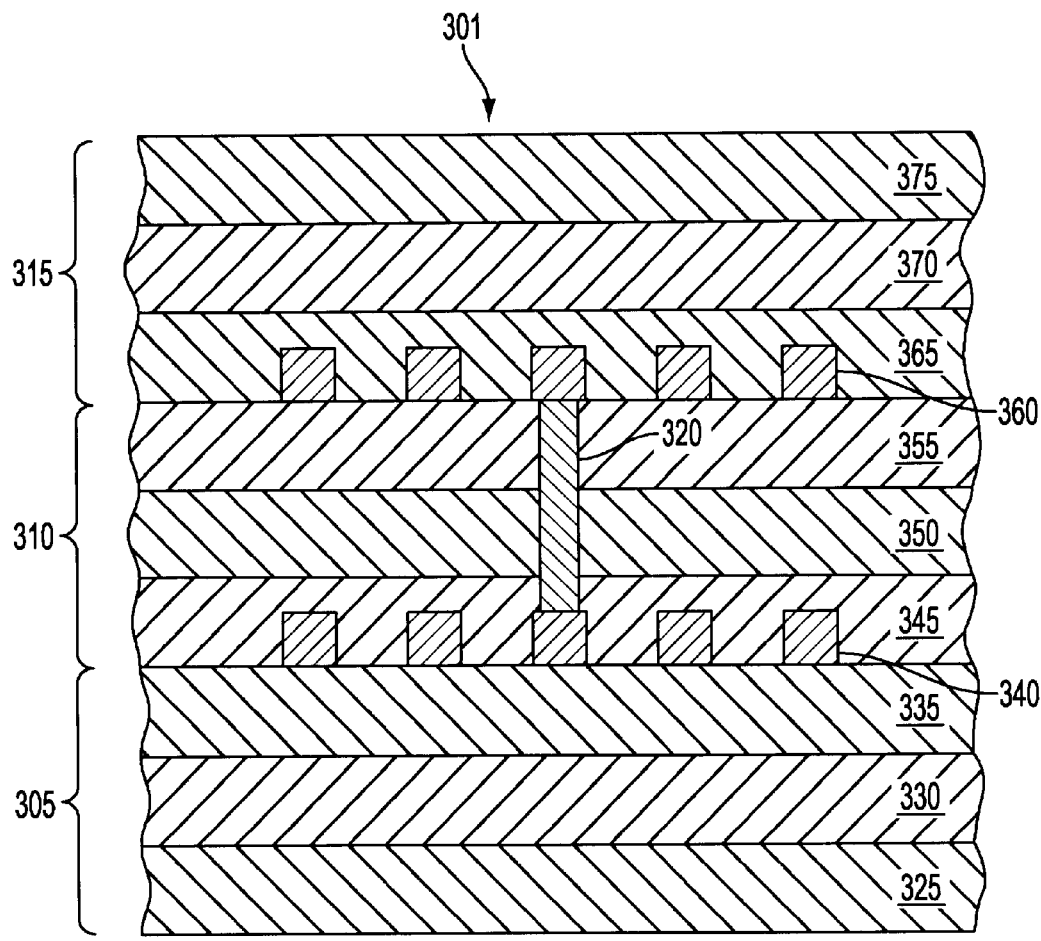
FIG. 3(e) illustrates a fragmentary vertical cross-sectional view of an alternate arrangement of an integrated circuit spiral inductor which may be used in the present invention.

An alternate means known in the art of providing a limited range of voltages used in electronic equipment is the charge pump circuit 50, illustrated in FIG. 2. An oscillator or ring oscillator circuit 54 drives the charge pump capacitor 58 through an amplifier 56. On the positive-going edge of the oscillator 54 waveform, the capacitor 58 charges through the diode 62 to a ground potential. On the negative-going edge of the oscillator 54 waveform, the capacitor 58 is driven to a negative voltage and the diode 66 conducts, charging the output capacitor 68 to a negative output voltage, $V_{BB}$. This output $V_{BB}$ is used as a back bias power supply or to convert logic pulses to current pulses for phase-locked loop (PLL) circuits.

Figure 4A:
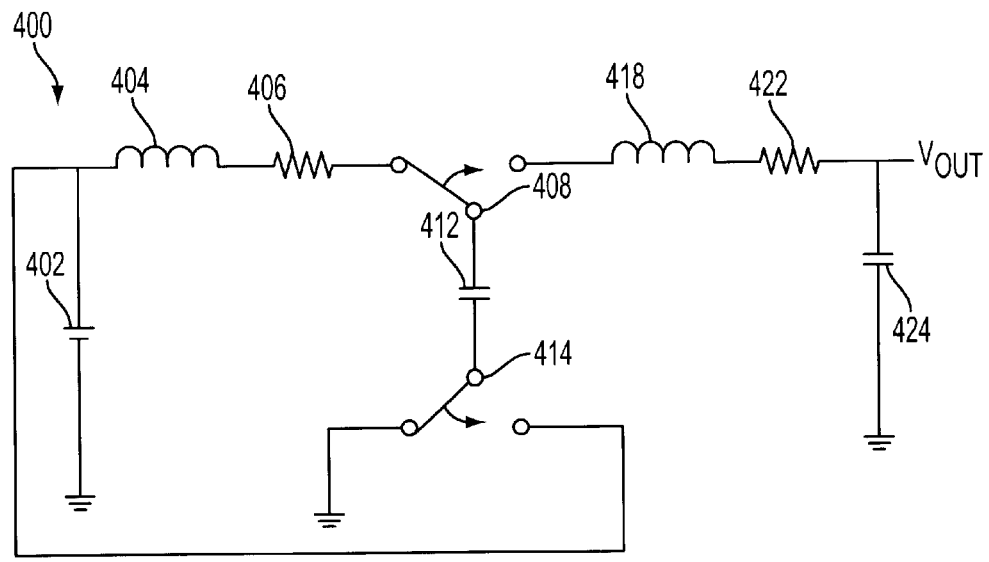
FIG. 4(a) shows a schematic diagram of a positive output DC to DC converter formed in accordance with a first embodiment of the present invention.
Figure 4B:
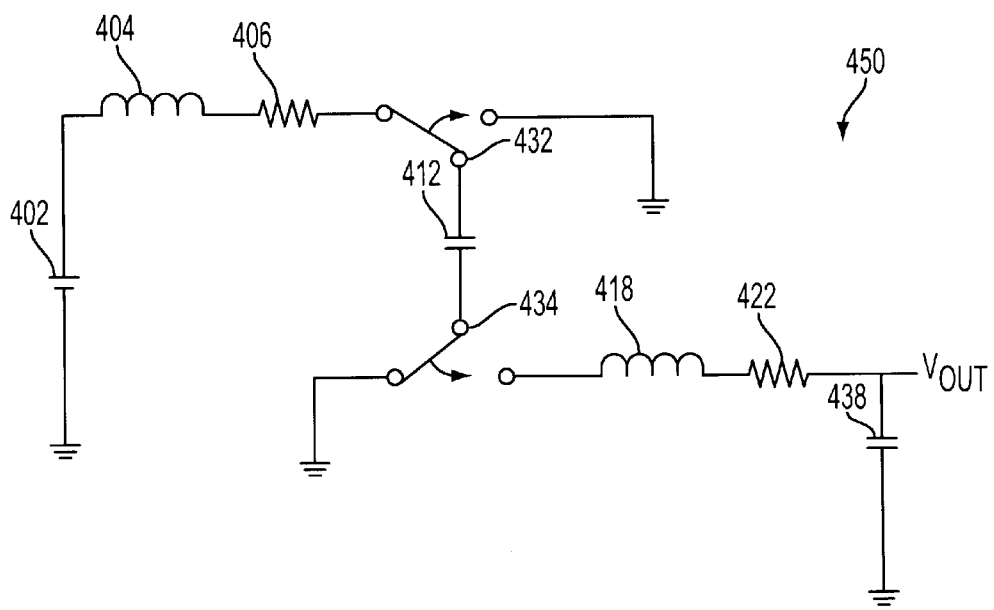
FIG. 4(b) shows a schematic diagram of a negative output DC to DC converter formed in accordance with a second embodiment of the present invention.

The present invention combines elements from both conventional DC to DC converter circuits and charge pump circuits to create a new class of DC to DC converters. FIG. 4(a) shows a first embodiment of the invention in which a switched capacitor 412 is arranged in a positive-output boost converter configuration (discussed below in more detail). This configuration is used to step up the voltage level of source 402 while preserving the polarity of the input DC power source (e.g., +5V input is stepped up to +9V output). The present invention is not limited to boost converters or non-inverting converters. FIG. 4(b) shows a second embodiment of the invention in which a switched capacitor is arranged in a negative output (inverting) buck converter configuration in which the output voltage is lesser in magnitude and reversed in polarity (e.g., +5V input is stepped down and inverted to −3.3V output relative to the voltage level of DC source 402). The switched capacitor design common to all embodiments of the present invention can also be used in other configurations allowing any combination of voltage level and polarity output relative to a voltage level and polarity of a DC source.

Referring to the positive output boost converter 400 of FIG. 4(a), DC power source 402 is connected through an inductor 404 having an associated inductive resistance 406 to one pole of switch 408. Switch 408 connects inductor 404 to capacitor 412 or alternately connects capacitor 412 to an output filter including inductor 418 having an associated resistance 422 and, between resistance 422 and ground, capacitor 424. Switch 414 connects the opposite plate of capacitor 412 to ground or alternately to DC power source 402. Switches 408 and 414 alternate between states at a frequency of about 100 MHz or more. The output voltage $V_{out}$ is the potential difference across the capacitor 424 and is used to power an external electronic component.

During the 'charging phase,' the capacitor 412 is charged through inductor 404 and associated resistance 406 by DC power source 402 when switches 408 and 414 are set to connect these components through to ground potential in the manner illustrated in FIG. 4(a). Thereafter, switches 408 and 414 change to a "transfer" state to connect DC power source 402 directly to the lower plate of capacitor 412 while the upper plate of capacitor 412 is connected to capacitor 424 through inductor 418 and associated resistance 422, thereby charging capacitor 424 to the output voltage $V_{out}$. The output voltage $V_{out}$ is approximately doubled from the input voltage at DC power source 402, as the voltage from source 402 adds to the voltage previously stored on capacitor 412 to charge capacitor 424. The inductor 418, associated resistance 422 and capacitor 424 also act as an output filter smoothing out any ripples in the output voltage $V_{out}$.

In addition, if switches 408 and 414 are set to change states when the inductor 404 current reaches zero and the voltage across the capacitor 412 is at a maximum, no stored energy will be lost in the inductor 404. By setting the frequency of all switches according to this scheme, a low-inductance inductor of approximately 100 nH can be used for inductor 404 with high frequency switches 408, 414 operating at 100 MHz or more to minimize energy loss and improve the efficiency of the converter.

FIG. 4(b) shows a schematic diagram of a negative output DC converter 450. DC power source 402 is connected through inductor 404 having associated resistance 406 to one pole of switch 432. An upper plate of capacitor 412 is also connected to switch 432 and the lower plate is connected to switch 434. Switch 432 connects inductor 404 to capacitor 412 or alternately connects capacitor 412 to ground. Switch 434 connects the capacitor 412 to ground or alternately connects capacitor 412 to an output filter including an inductor 418, associated resistance 422 and a capacitor 438. Capacitor 438 is connected between resistance 422 and ground. The output voltage $V_{out}$ is the potential difference across the capacitor 438 and is used to power an external electronic component.

The negative output DC converter 450 shown in FIG. 4(b) operates to produce an output voltage $V_{out}$ reversed in polarity relative to the voltage of the input DC source 402. During the 'charging phase,' capacitor 412 is charged through the inductor 404 and associated resistance 406 by DC power source 402 when switches 432 and 434 are set to connect these components through to a ground potential. Thereafter, switches 432 and 434 change to a transfer state to connect the upper plate of capacitor 412 directly to a ground potential and the lower plate of capacitor 412 to the output filter including capacitor 438, inductor 418 and associated resistance 422. This causes capacitor 438 to charge to a voltage which is opposite in polarity to the source voltage 402, i.e. to a negative voltage. The output voltage $V_{out}$, smoothed by the output filter, is thus reversed in polarity from the input voltage to the converter from source 402. Similar to the positive output converter, the frequency of the switches 432, 434 is set according to the inductance value of the inductor 404 to minimize energy loss and improve efficiency.

The switches 408 and 414 in FIG. 4(a) and switches 432 and 434 in FIG. 4(b) change states in response to external clock signals generated by an external controller which is analogous to the control circuit 14 in the conventional boost converter 30 shown in FIG. 1(c). The clock signals are sent to each switch periodically in accordance with a clock frequency of a constant value.

Because modern integrated circuit switches are designed to operate at frequencies of 100 MHz or more, the inductance value of the inductors 404, 418 required in the present invention is significantly lower than conventional converters which generally operate at a lower frequency. Inductance values on the order of micro Henrys ($1 \times 10^{-6}$ H) or higher are required for conventional forward, buck, or boost converters. Such large inductors and/or transformers (for forward converters) are not compatible with CMOS integrated circuit processing. However, due to its high frequency operation, the present invention requires inductance values on the order of 100 nH ($100 \times 10^{-9}$ H), a difference of a factor often, which may be fabricated directly on a CMOS integrated circuit.

Figure 5:
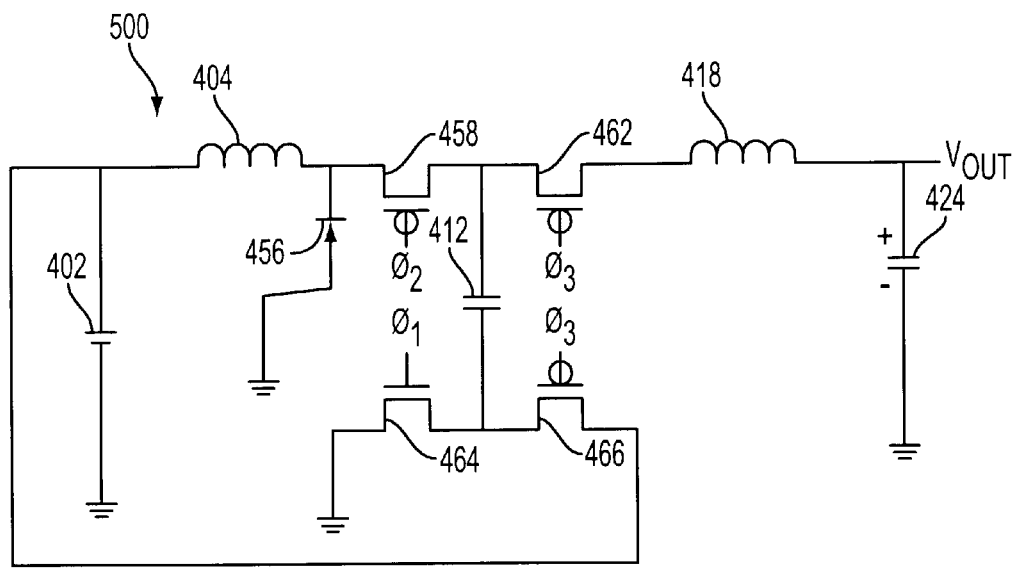
FIG. 5 shows a schematic diagram of the positive output DC to DC converter of FIG. 4(a) with transistors used for the switches.
Figure 6:
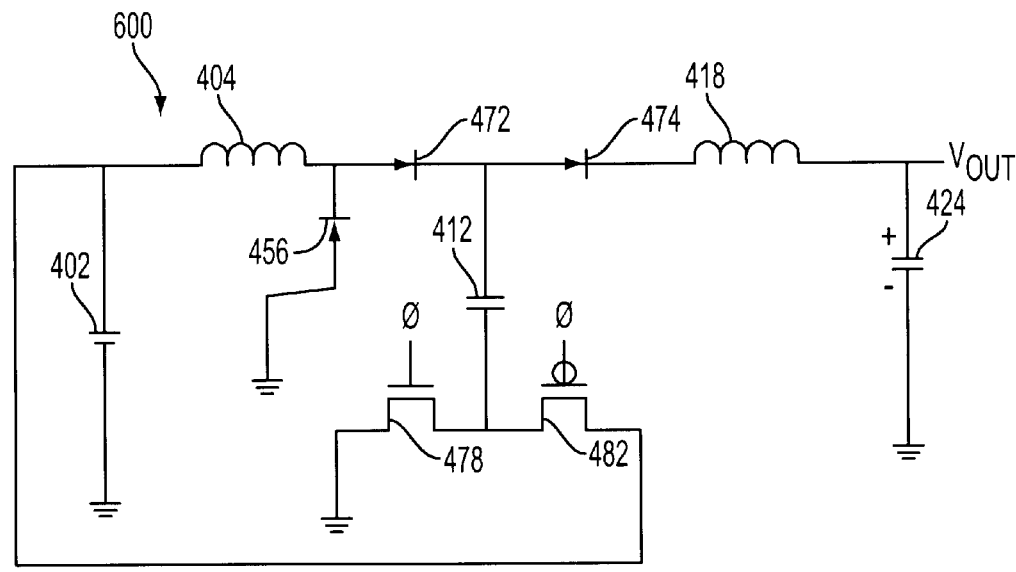
FIG. 6 shows a schematic diagram of the positive output DC to DC converter of FIG. 4(a) with diodes and transistors used for the switches.
Figure 10:
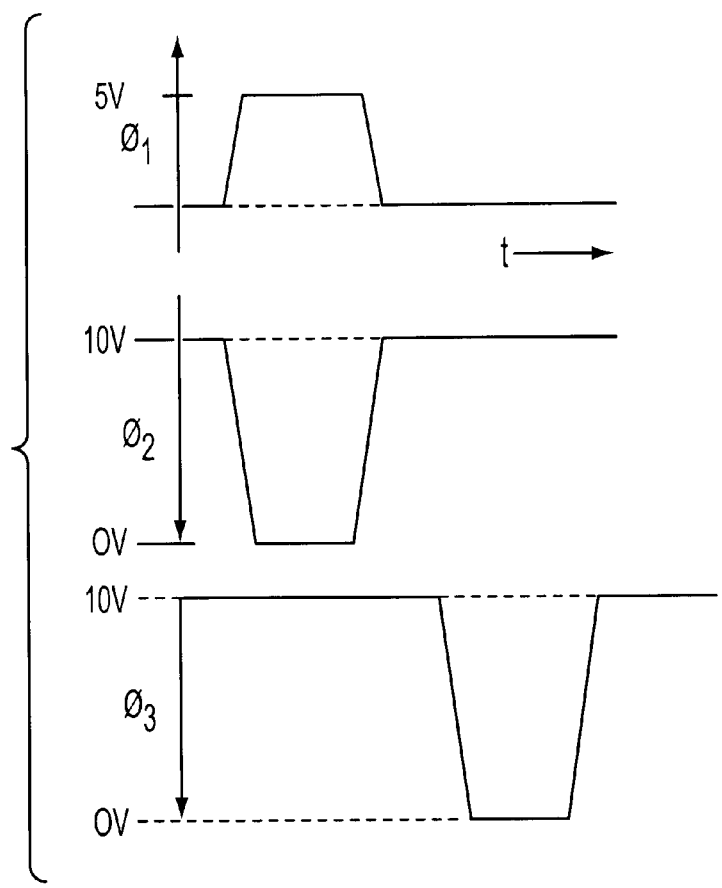
FIG. 10 is a phase/clock timing diagram for the DC to DC converters shown in FIGS. 5 and 7.

FIGS. 5 and 6 show schematic diagrams of two different specific implementations of the positive output converter depicted in FIG. 4(*a*). FIG. 5 shows a DC to DC converter 500 which is essentially the same as that depicted in FIG. 4(*a*), but with transistors 458, 462, 464, 466 used as the switches 408, 414 of FIG. 4(*a*). Switches 458, 462, 464, and 466 change states according to a three component clocking scheme represented by clock signals $\phi_1$, $\phi_2$, $\phi_3$, the timing of which is shown in FIG. 10. The implementation shown in FIG. 5 requires multiple clocks, increasing circuit complexity and consuming circuit power, hence reducing the efficiency of the converter. Diode 456 is a clamping diode which provides a closed path for any residual currents in inductor 404 and prevents large negative voltages at the switch 458 when the switch 458 turns off. Also, if the inductors 404 and 418 are integrated inductors, such as those illustrated in FIGS. 3(*a*)–(*e*), the entire converter 500 shown in FIG. 5 may be fabricated on a single integrated circuit chip.

Figure 11:
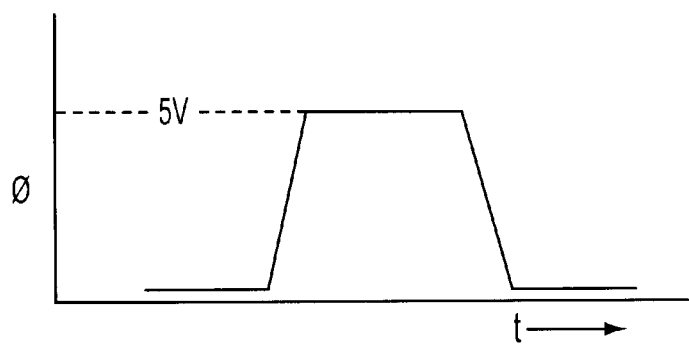
FIG. 11 is a phase/clock timing diagram for the DC to DC converters shown in FIGS. 6 and 8.

One technique to increase the efficiency of the converter is to replace some of the transistor switches with diodes, which conduct in only one direction and will function as switches for the circuit of the present invention. FIG. 6 shows a modification of the output DC boost converter of FIG. 5, where switches 458 and 462 of FIG. 5 have been replaced with diodes 472 and 474. Diodes are simpler devices than transistors, requiring no clock input, and thus dissipate minimal energy. However, a voltage drop occurs across all diodes, robbing the circuit of some efficiency. For the present invention, a voltage drop of 0.7V is assumed to occur across each integrated circuit diode 472, 474. The resulting converter 600 with diodes shown in FIG. 6, however, is less complex and does not require multiple clocks to generate extra clock signals. Note that only a single clock, with clocking scheme shown in FIG. 11, is required to establish the frequency and phase of the converter, because the input to switch 482 is inverted relative to switch 478. In addition, less power is dissipated through use of a simpler clock scheme. Diode 456 provides a closed path for any residual inductor currents and prevents large negative voltages at switch 472. Also, if the inductors 404 and 418 are integrated inductors, such as those illustrated in FIGS. 3(*a*)–(*e*), the entire converter 600 shown in FIG. 6 may be fabricated on a single integrated circuit chip.

Figure 7:
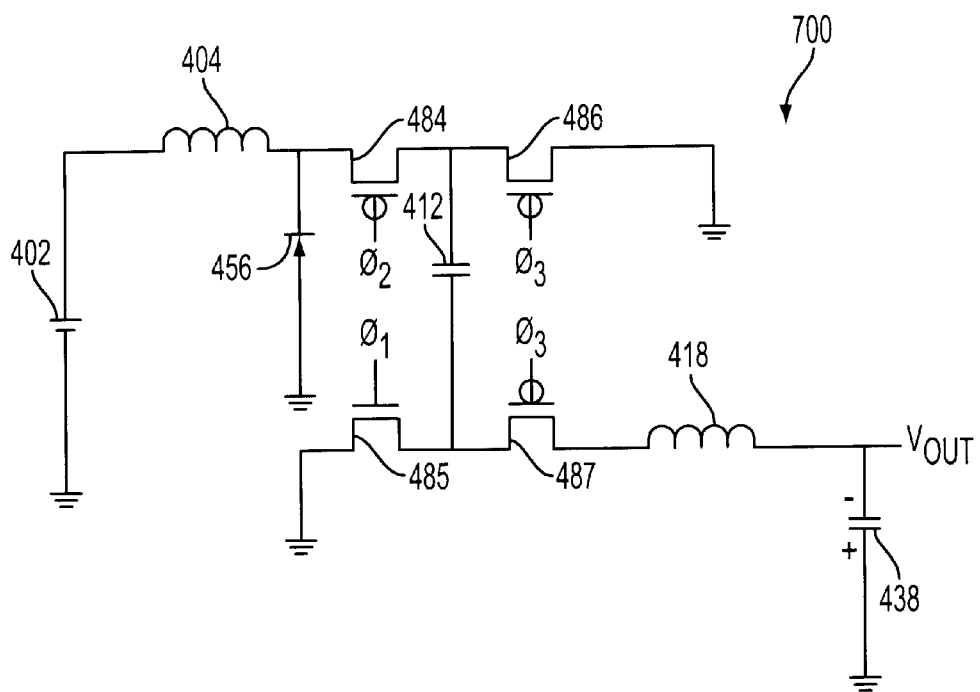
FIG. 7 shows a schematic diagram of the negative output DC to DC converter of FIG. 4(b) with transistors used for the switches.

FIG. 7 shows a negative output DC converter 700 similar to that depicted in FIG. 4(*b*), described above, with transistors 484, 485, 486 and 487 used as switches. Switches 484, 485, 486 and 487 change states according to a clocking scheme represented by clock signals $\phi_1$, $\phi_2$, $\phi_3$, the timing of which is shown in FIG. 10. DC power source 402 charges capacitor 412 through inductor 404 during the charging phase, and capacitor 438 is charged through inductor 418 to output voltage $V_{out}$ during the transfer phase. Diode 456 provides a closed path for any residual inductor currents and prevents large negative voltages at switch 484. The implementation shown in FIG. 7 requires multiple clocks with clocking scheme shown in FIG. 10, increasing circuit complexity and consuming circuit power, hence somewhat reducing the efficiency of the converter. If the inductors 404 and 418 are integrated inductors, such as those illustrated in FIGS. 3(*a*)–(*e*), the entire converter 700 may be fabricated on a single integrated circuit chip.

Figure 8:
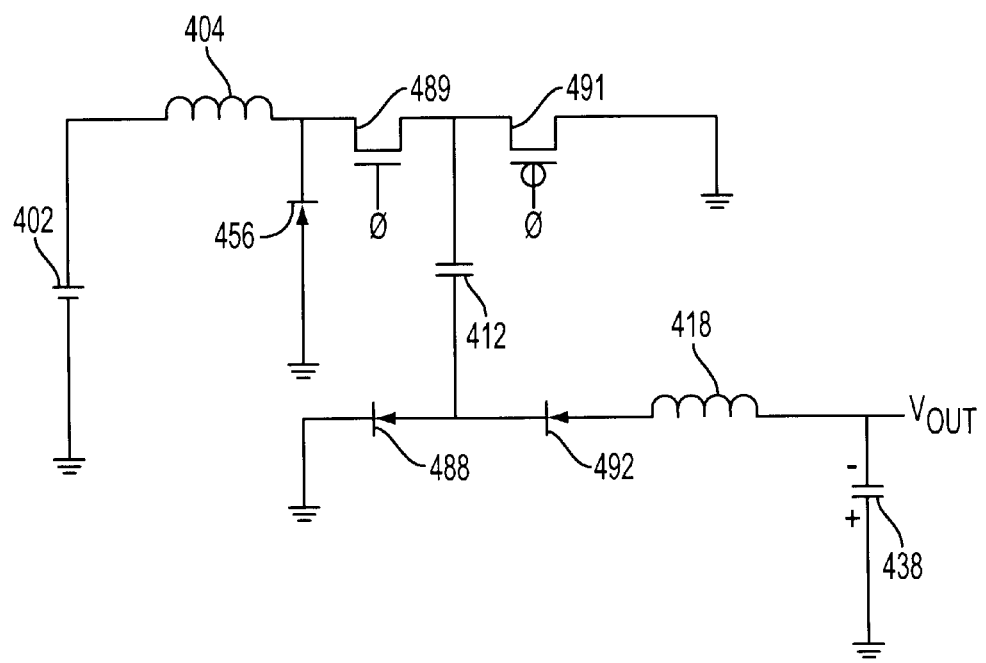
FIG. 8 shows a schematic diagram of the negative output DC to DC converter of FIG. 4(b) with diodes and transistors used for the switches.

FIG. 8 shows a modification of the DC to DC converter of FIG. 7, where switches 485 and 487 of FIG. 7 have been replaced with diodes 488 and 492. Diodes are simpler devices than transistors, requiring no clock input, and thus dissipate minimal energy. However, a voltage drop occurs across all diodes, robbing the circuit of some efficiency. For the present invention, a voltage drop of 0.7V is assumed to occur across each diode 488, 492. Diode 456 provides a closed path for any residual inductor currents and prevents large negative voltages at switch 489. The converter 800 shown in FIG. 8, however, is less complex and does not require multiple clocks to generate extra clock signals. Note that only a single clock, with clocking scheme shown in FIG. 11, is required to establish the frequency and phase of the converter, because the input to switch 491 is inverted relative to switch 489. In addition, less power is dissipated through use of a simpler clock scheme. Also, if the inductors 404 and 418 are integrated inductors, such as those illustrated in FIGS. 3(*a*)–(*e*), the entire converter 800 shown in FIG. 8 may be fabricated on a single integrated circuit chip.

Figure 12:
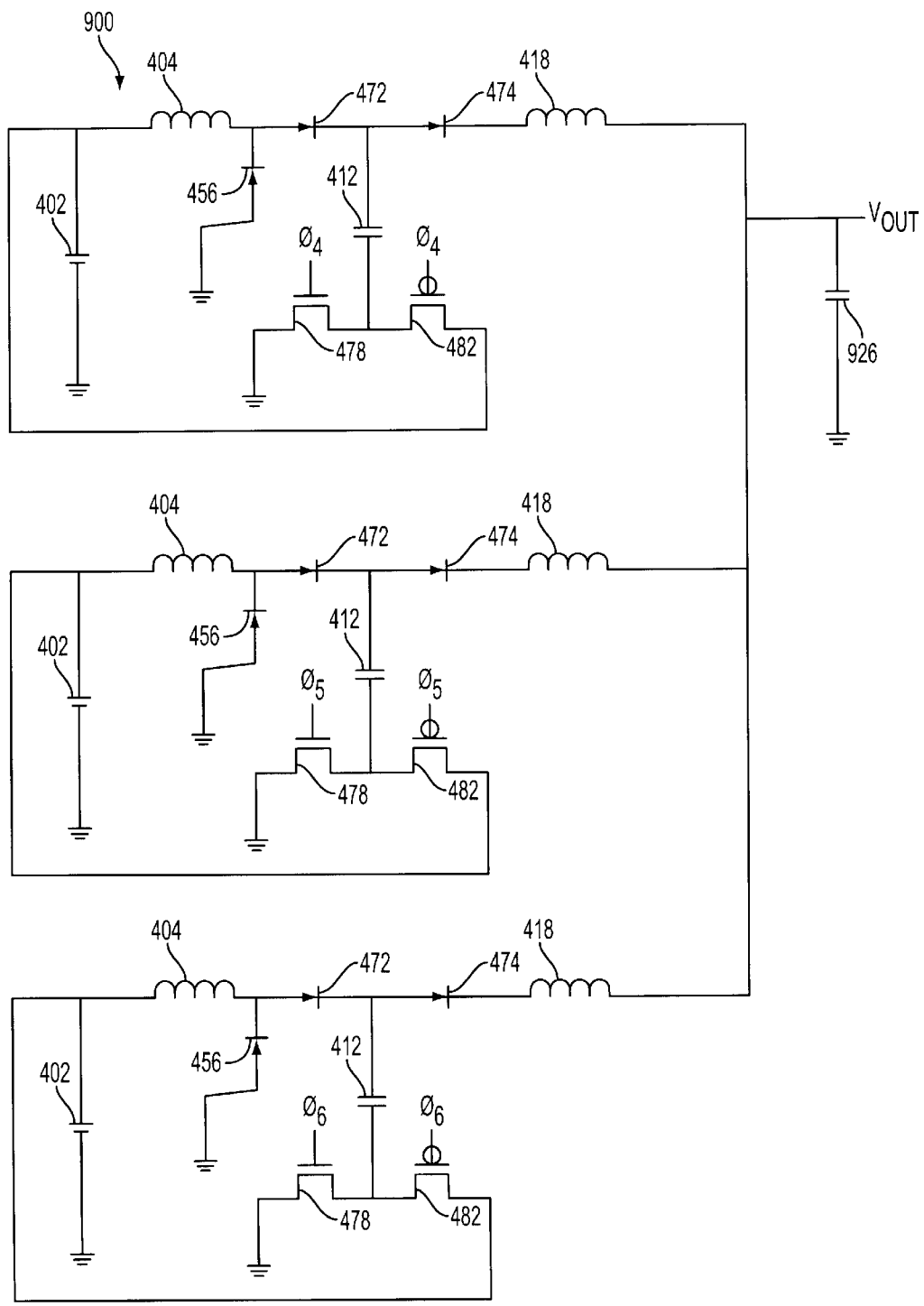
FIG. 12 shows a schematic diagram of a positive output DC to DC converter formed in accordance with a third embodiment of the present invention using several DC to DC converter circuits connected in parallel.
Figure 13:
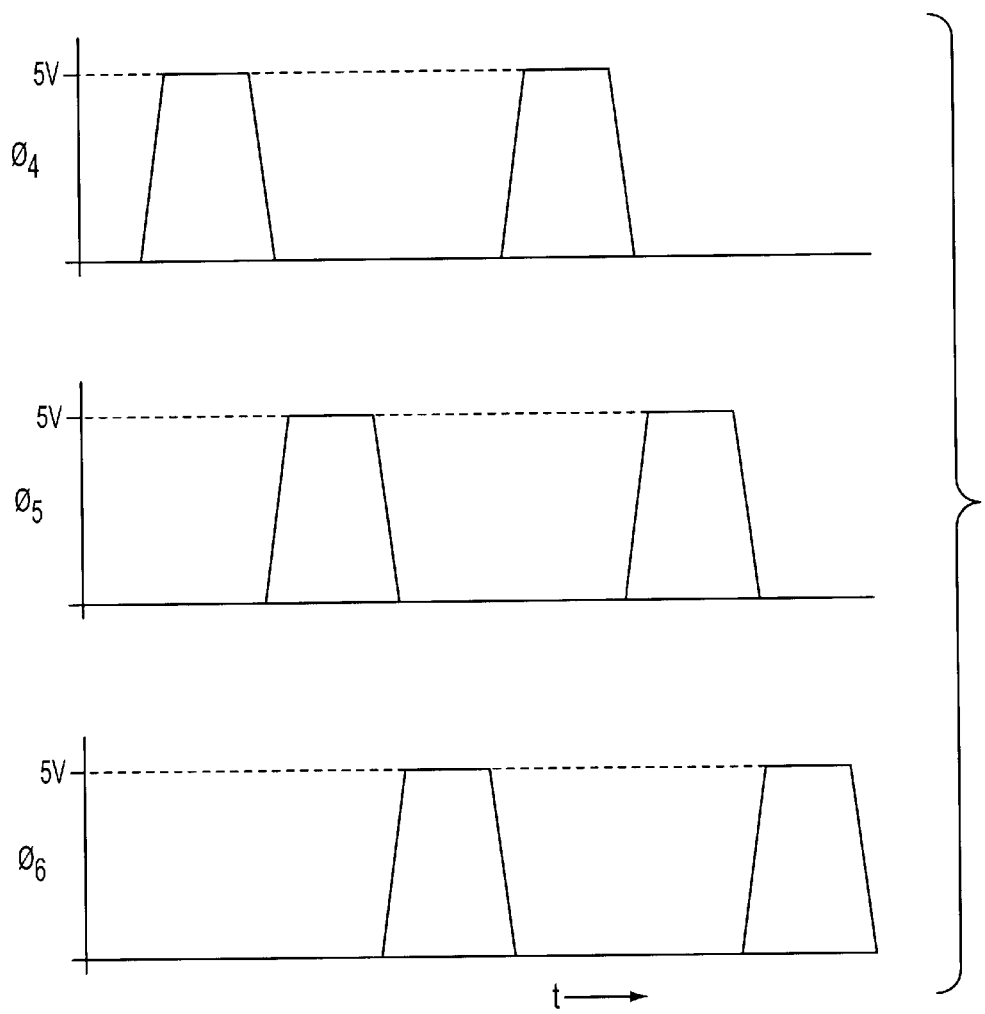
FIG. 13 is a phase/clock diagram for the DC to DC converter of FIG. 12.

Another embodiment of the present invention, illustrated in FIG. 12, provides reduced fluctuations in the power supply output voltage (ripple voltage) when several DC converter circuits (constructed as described above) are used in parallel to charge a single capacitor. For example, a plurality (three shown) of DC converters 600 of FIG. 6 could be connected in parallel, as shown in FIG. 12, each containing all of the components of converter 600 except for the output capacitor 926 and ground. The clocking scheme of the switches must be coordinated as shown in FIG. 13, i.e. the first parallel circuit is clocked by $\phi_4$, the second parallel circuit is clocked by $\phi_5$, and the third parallel circuit is clocked by $\phi_6$, as shown in FIG. 12. While $\phi_4$, $\phi_5$ and $\phi_6$ have the same clocking frequency, they are phase offset from one another. Following the FIG. 13 clocking scheme, the parallel circuit is connected as shown in FIG. 12 such that each circuit charges output capacitor 926 at different time periods, thus reducing voltage fluctuations (ripple voltage) at the output $V_{out}$.

FIGS. 3(*a*) and 3(*b*) show a first integrated circuit inductor which may be used for inductors 404, 418 in the present invention, while FIGS. 3(*c*) and 3(*d*) show a second integrated circuit inductor which may be used in the present invention. FIG. 3(*e*) shows an alternate embodiment of the second integrated circuit inductor of FIGS. 3(*c*) and 3(*d*). Although the present invention is not to be limited to the use of such inductors, these IC inductors, which can be directly fabricated in an IC chip, offer additional space and power density advantages over discrete inductors externally mounted to an IC chip.

FIG. 3(*a*) shows an exploded perspective view of a first integrated inductor formed from a solenoidal inductor pattern 100. Solenoidal pattern 100 is made up of three vertically stacked open conductive patterns 103, 106 and 109 coupled together by conductive segments 112 and 115. In the embodiment shown in FIG. 3(*a*), each of the three open conductive patterns 103, 106, 109 is an open rectangle. However, the present invention is not limited to a particular open pattern shape. Any shape or shapes that can be combined to form a device in which the voltage across the device is proportional to the derivative of the current passing through the device is suitable for use in connection with the present invention.

Open conductive patterns 103, 106 and 109 are fabricated from a conductive material. In one embodiment, open conductive patterns 103, 106 and 109 are fabricated from copper. In alternate embodiments, they are formed from gold, aluminum, silver, or an alloy of copper, gold, aluminum, or silver, or any combination of metals or alloys capable of conducting electric current.

Also, open conductive patterns 103, 106 and 109 each have a cross-sectional area which varies directly with the current-carrying capacity and varies inversely with the resistance. In other words, as the cross-sectional area decreases, the resistance increases and the current carrying capacity of the open conductive patterns 103, 106, and 109 decreases. The cross sectional area of each pattern 103, 106, 109 is selected to ensure that it is capable of carrying the anticipated operating current.

Referring to FIG. 3(*a*), open conductive pattern 103 is coupled to open conductive pattern 106 by conductive segment 112, which is perpendicular to both open conductive patterns 103 and 106. Similarly, open conductive patterns 106 and 109 are coupled by conductive segment 115, which is perpendicular to both open conductive patterns 106 and 109.

Each of the open conductive patterns 103, 106, and 109 shown in FIG. 3(*a*) can be fabricated from a different material. For example, open conductive pattern 103 can be fabricated from aluminum, pattern 106 can be fabricated from copper, and pattern 109 from gold. This provides some flexibility for the inductor designer to control inductor characteristics, such as controlling heat generation by incorporating higher conductivity material into specific sections of the inductor. In addition, the designer is able to control the location of particular materials to limit impurity migration, such as to avoid the incorporation of a barrier layer to protect a substrate from copper migration by instead locating any copper sufficiently far from the substrate.

FIG. 3(*b*) shows a side view of a cross-sectional slice of solenoid inductor 100 fabricated on a substrate 203. The fabricated structure 200 includes magnetic material layers 206, 212, 221, 233, open inductor patterns 103, 106, 109, and conductive segments 112, 115. Each of the layers, patterns and/or segments may be produced by chemical vapor deposition (CVD) or other processes for metallization, metal layering, and/or etching as is known in the art. Substrate 203 is preferably a semiconductor, such as silicon. Alternatively, substrate 203 is gallium arsenide, germanium, or some other substrate material suitable for use in the manufacturing of integrated circuits.

FIGS. 3(*c*) and 3(*d*) depict a second integrated inductor with square spiral inductor pattern 140 which may be used as inductor 404, 418 in the invention. A first integrated inductor with a square spiral pattern 140 is shown in FIG. 3(*c*). The pattern 140 need not be limited to a square spiral, but may instead be a circular spiral, polygonal spiral, or any contiguous open pattern fabricated from a conductive material. The square spiral inductor pattern 140 is preferred because it is easy to manufacture. Pattern 140 is also preferably fabricated from a high-conductivity material such as copper, but may alternatively be formed from other conducting materials, such as gold, aluminum, silver, or an alloy of copper, gold, aluminum, or silver, or any combination of metals or alloys capable of conducting electric current.

FIG. 3(*d*) shows a fragmentary vertical cross-sectional view of a second integrated inductor structure 300 using the square spiral inductor pattern 140. The square spiral inductor pattern 140 of FIG. 3(*c*) is included in the integrated inductor structure 300 as the square cross-sectional areas 230 in FIG. 3(*d*). Referring to FIG. 3(*d*), integrated inductor structure 300 is coupled to conducting path 220 through vias 240 to peripheral connection 210. Inductor structure 300 is composed of several layers fabricated on substrate 302 and includes magnetic material layer 304, insulating layer 306, inductor pattern 230, second insulating layer 308, and second magnetic material layer 312. Each layer is formed on the layer below it through deposition or other processes known in the art.

Insulating layers 306 and 308 may be formed from inorganic silicon oxide film, silicon dioxide, or other inorganic insulating materials known in the art. In alternate embodiments designed for a low temperature processing environment, insulating layers 306 and 308 may be organic insulators, such as parylene and polyimide.

Substrate 302 is preferably a semiconductor, such as silicon. Alternatively, substrate 302 is gallium arsenide, germanium, or some other substrate material suitable for use in the manufacturing of integrated circuits. Inductors intended for use in circuits fabricated on a silicon substrate usually operate at a slightly lower frequency, hence requiring slightly larger inductance values, than inductors intended for use in circuits fabricated on a gallium arsenide substrate. A larger inductance value is usually realized in silicon by having the inductor occupy a larger surface area. Rather than increasing the inductance value by occupying a larger surface area, a larger inductance value is here achieved by adding layers of magnetic material 304 and 312 to the inductor. Magnetic material layers 304 and 312 allow the inductor to store a larger amount of energy in a smaller space, increasing the inductance value.

Magnetic material layers 304 and 312 may be formed from a magnetic material selected according to the inductance requirement. In embodiments in which a large inductance value in a small volume is desired, a high permeability ferromagnetic material, such as pure iron or a NiFe alloy is selected. One example of such a high permeability alloy is an alloy of 81% Ni and 19% Fe. Electrically non-conducting films, such as a magnetic oxide film, may also be suitable for use in the present invention.

Locating magnetic material layers 304 and 312 above and below inductor pattern 230, respectively, allows the contribution of the magnetic material to the inductance value of the inductor to be precisely controlled. The thickness of the magnetic material layers 304 and 312 and the magnetic properties of the magnetic material define the inductance value of the inductor structure 300. In addition, magnetic material layers 304 and 312 confine the magnetic flux and noise radiated by current flowing in inductor pattern 230 to the area bounded by the outer surfaces of layers 304 and 312.

By stacking sandwich structures, as well as multiple inductor patterns, a larger inductance can be created without increasing the surface area on the substrate occupied by the inductor, as shown in FIG. 3(*e*). Referring to FIG. 3(*e*), one embodiment of a double inductor structure 301 containing two inductors is shown. Double inductor structure 301 includes base structure 305, first sandwich structure 310, second sandwich structure 315, and conducting path 320. Base structure 305 includes substrate 325, magnetic material layer 330, and insulating layer 335. Sandwich structure 310 includes inductor pattern 340, insulating layer 345, magnetic material layer 350, and insulating layer 355. Second sandwich structure 315 includes inductor pattern 360, insulating layer 365, magnetic material layer 370, and insulating layer 375.

Conducting path 320 couples sandwich structure 310 to second sandwich structure 315, and serially connects inductor pattern 340 to inductor pattern 360. A current flowing in the serially connected inductor patterns creates a reinforcing magnetic field in magnetic material layer 350. Magnetic material layers 330 and 370 are located below inductor pattern 340 and above inductor pattern 360, respectively. Magnetic material layers 330 and 370 confine the magnetic flux and noise radiated by a current flowing in inductor patterns 340 and 360 to the area bounded by the outer surfaces of magnetic material layers 330 and 370. By stacking sandwich structures, in one embodiment a large inductance can be created without increasing the surface area occupied by the inductor on the substrate.

Figure 9:
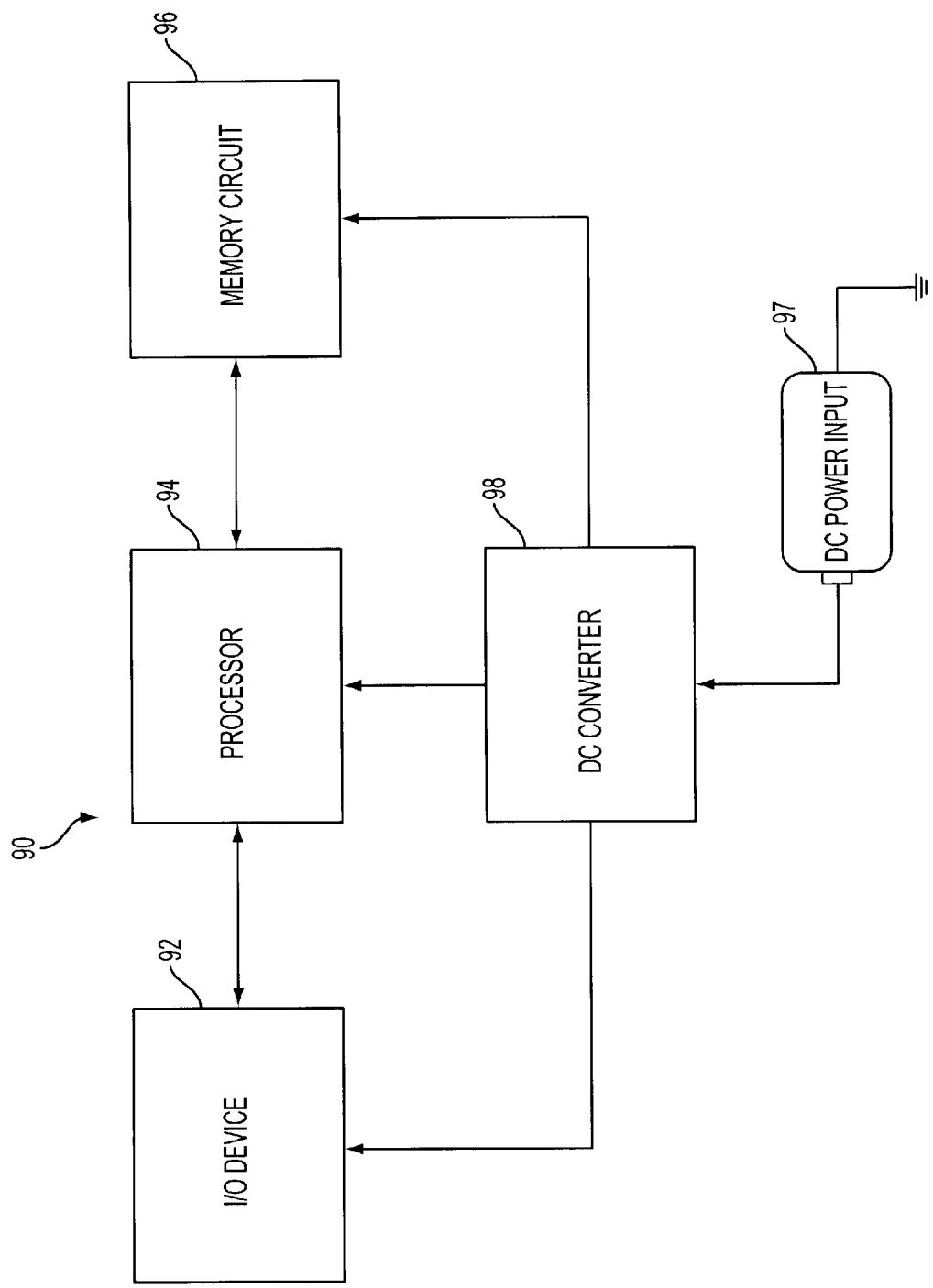
FIG. 9 is a block diagram of a processor-based system including a DC to DC converter formed in accordance with the present invention.

FIG. 9 illustrates a processor-based system 90, e.g. a computer system, which utilizes the DC—DC converter of the present invention. The processor-based system 90 comprises a processor 94, a memory circuit 96, and an input/output (I/O) device 92. One or more of the components of the processor-based system 90, for example, one or more of the processor 94 and memory circuit 96, also includes a DC power source 97 connected to a ground potential and to a DC to DC converter 98 constructed in accordance with the present invention (see FIGS. 4–8 and 12). The memory circuit 96 contains one or more of a random access memory (RAM), for example a DRAM, SRAM, SDRAM, or other type of RAM known in the art, or a read only memory (ROM), for example an EPROM, and EEPROM, flash memory, or other type of ROM known in the art. The processor 94 may be an embedded-memory processor in which the memory circuit 96 is included on the same IC chip as the processor 94. The DC to DC converter 98 may also be included on the same IC chip as either or both of the processor 94 and memory circuit 96.

The present invention provides a DC—DC converter with inductive current limiters to improve efficiency as well as conserve valuable space using integrated components, including integrated inductors. These improvements remove the need for bulky conventional inductors and improve power densities and thermal properties of the resulting device while simplifying the circuit and allowing higher output currents, which can be used, for example, for EEPROM reprogramming. Low voltage and low power consumption of the converter permits its implementation in battery-powered portable electronics.

While the invention has been described in detail in connection with the preferred embodiments known at the time, it should be readily understood that the invention is not limited to such disclosed embodiments. For example, use of the converter is not limited to the computer system implementation described above, but may be incorporated anywhere multiple voltages are needed. Rather, the invention can be modified to incorporate any number of variations, alterations, substitutions or equivalent arrangements not heretofore described, but which are commensurate with the spirit and scope of the invention. Accordingly, the invention is not to be seen as limited by the foregoing description, but is only limited by the scope of the appended claims.

What is claimed as new and desired to be protected by Letters Patent of the United States is:

1. A DC to DC power converter comprising:
   an input terminal for receiving an input voltage;
   a charging inductor;
   an output terminal for outputting an output voltage different from said input voltage;
   a first capacitor; and
   a switch circuit operating at a switching frequency of at least about 100 mega Hertz for coupling said input terminal to said first capacitor through said charging inductor during a charging phase, said first capacitor being charged during said charging phase, said switch circuit coupling said first capacitor to said output terminal during a transfer phase whereby said first capacitor transfers charge to said output terminal.

2. The DC converter of claim 1 wherein said charging inductor has an inductance value less than about 1 micro Henry.

3. The DC converter of claim 1 wherein said switching frequency and an inductance value of said charging inductor are chosen such that there is substantially no current in said charging inductor when said switch circuit transitions from said charging phase to said transfer phase.

4. The DC converter of claim 1 further comprising an output filter connected to said switch circuit and said output terminal whereby said first capacitor transfers charge through said output filter to said output terminal during said transfer phase.

5. The DC converter of claim 4 wherein said output filter includes at least one output capacitor.

6. The DC converter of claim 4 wherein said output filter includes at least one output inductor and at least one output capacitor.

7. The DC converter of claim 1 wherein said switch circuit includes a first switch connected to open or close a first connection between said input terminal and a positive plate of said first capacitor, a second switch connected to open or close a second connection between said positive plate and a ground potential, a third switch connected to open or close a third connection between a negative plate of said first capacitor and said ground potential, and a fourth switch connected to open or close a fourth connection between said negative plate and said output terminal.

8. The DC converter of claim 7 wherein said first switch, said second switch, said third switch and said fourth switch are transistors.

9. The DC converter of claim 7 wherein said first switch and said second switch are transistors, and said third switch and said fourth switch are diodes.

10. The DC converter of claim 1 wherein said input voltage is between about −25 to +25 volts.

11. The DC converter of claim 1 wherein said input voltage is less than or equal to about +5 volts.

12. The DC converter of claim 1 wherein said input voltage is greater than or equal to about −5 volts.

13. The DC converter of claim 1 wherein said charging phase and said transfer phase do not overlap.

14. The DC converter of claim 1 wherein said charging inductor is an integrated circuit inductor.

15. The DC converter of claim 14 wherein said integrated circuit inductor is a spiral inductor.

16. The DC converter of claim 14 wherein said integrated circuit inductor is a double-stacked spiral inductor.

17. The DC converter of claim 14 wherein said integrated circuit inductor is a solenoidal inductor.

18. The DC converter of claim 1 wherein the components of said converter are fabricated on at least one integrated circuit chip.

19. The DC converter of claim 1 wherein the converter, including said inductor, is fabricated on a single integrated circuit chip.

20. The DC converter of claim 1 wherein the converter, excluding said inductor, is fabricated on a single integrated circuit chip.

21. The DC converter of claim 8 or 9 wherein said transistors are CMOS transistors.

22. The DC converter of claim 1 further comprising at least one control terminal for receiving at least one control signal, said switch circuit operating at said switching frequency in response to said at least one received control signal.

23. A DC to DC power converter comprising:
an input terminal for receiving an input voltage;
a charging inductor;
an output terminal for outputting an output voltage different from said input voltage;
a first capacitor; and
a switch circuit operating at a switching frequency permitting said charging inductor to have an inductance value less than 1 micro Henry, said switch circuit coupling said input terminal to said first capacitor through said charging inductor during a charging phase, said first capacitor being charged during said charging phase, said switch circuit coupling said first capacitor to said output terminal during a transfer phase whereby said first capacitor transfers charge to said output terminal.

24. The DC converter of claim 23 wherein said charging inductor has an inductance value of approximately 100 nH or less.

25. The DC converter of claim 23 wherein said switching frequency is at least about 100 MHz.

26. The DC converter of claim 23 wherein said switching frequency and an inductance value of said charging inductor are chosen such that there is substantially no current in said charging inductor when said switch circuit transitions from said charging phase to said transfer phase.

27. The DC converter of claim 23 further comprising an output filter connected to said switch circuit and said output terminal whereby said first capacitor transfers charge through said output filter to said output terminal during said transfer phase.

28. The DC converter of claim 27 wherein said output filter includes at least one output capacitor.

29. The DC converter of claim 27 wherein said output filter includes at least one output inductor and at least one output capacitor.

30. The DC converter of claim 23 wherein said switch circuit includes a first switch connected to open or close a first connection between said input terminal and a positive plate of said first capacitor, a second switch connected to open or close a second connection between said positive plate and a ground potential, a third switch connected to open or close a third connection between a negative plate of said first capacitor and said ground potential, and a fourth switch connected to open or close a fourth connection between said negative plate and said output terminal.

31. The DC converter of claim 30 wherein said first switch, said second switch, said third switch and said fourth switch are transistors.

32. The DC converter of claim 30 wherein said first switch and said second switch are transistors, and said third switch and said fourth switch are diodes.

33. The DC converter of claim 23 wherein said input voltage is between about −25 to +25 volts.

34. The DC converter of claim 23 wherein said input voltage is less than or equal to about +5 volts.

35. The DC converter of claim 23 wherein said input voltage is greater than or equal to about −5 volts.

36. The DC converter of claim 23 wherein said charging inductor is an integrated circuit inductor.

37. The DC converter of claim 36 wherein said integrated circuit inductor is a spiral inductor.

38. The DC converter of claim 36 wherein said integrated circuit inductor is a double-stacked spiral inductor.

39. The DC converter of claim 36 wherein said integrated circuit inductor is a solenoidal inductor.

40. The DC converter of claim 23 wherein the components of said converter are fabricated on at least one integrated circuit chip.

41. The DC converter of claim 23 wherein the converter, including said inductor, is fabricated on a single integrated circuit chip.

42. The DC converter of claim 23 wherein the converter, excluding said inductor, is fabricated on a single integrated circuit chip.

43. The DC converter of claim 31 or 32 wherein said transistors are CMOS transistors.

44. The DC converter of claim 23 further comprising at least one control terminal for receiving at least one control signal, said switch circuit operating at said switching frequency in response to said at least one received control signal.

45. A DC to DC converter, comprising:
a charge transfer capacitor;
a terminal for receiving a DC source voltage;
a ground connection;
a first inductive circuit coupled to said terminal;
a second inductive circuit;
an output capacitor coupled between said second inductive circuit and said ground connection;
a switch circuit operative in a first mode to couple said terminal through said first inductive circuit to a first plate of said charge transfer capacitor and to couple said ground connection to a second plate of said charge transfer capacitor to enable said charge transfer capacitor to be charged by a DC voltage applied to said terminal, said switch circuit being operative in a second mode to couple said first plate of said charge transfer capacitor to said second inductive circuit and to couple said second plate of said charge transfer capacitor to said terminal to enable said output capacitor to be charged by an additive DC voltage formed by a DC voltage at said terminal and a DC voltage on said charge transfer capacitor.

46. A DC to DC converter, comprising:
a charge transfer capacitor;
a terminal for receiving a DC source voltage;
a ground connection;
a first inductive circuit coupled to said terminal;
a second inductive circuit;
an output capacitor coupled between said second inductive circuit and said ground connection;
a switch circuit operative in a first mode to couple said terminal through said first inductive circuit to a first plate of said charge transfer capacitor and to couple said ground connection to a second plate of said charge transfer capacitor to enable said charge transfer capacitor to be charged by a DC voltage applied to said terminal, said switch circuit being operative in a second mode to couple said first plate of said charge transfer capacitor to said ground connection and to couple said second plate of said charge transfer capacitor to said second inductive circuit to enable said output capacitor to be charged by a DC voltage on said charge transfer capacitor.

47. The DC to DC converter of claim 46 wherein said switch circuit includes a first switch connected to open or close a first connection between said first inductive circuit and said first plate of said charge transfer capacitor, a second switch connected to open or close a second connection between said first plate of said charge transfer capacitor and said ground connection, a third switch connected to open or close a third connection between said second plate of said charge transfer capacitor and said ground connection, and a fourth switch connected to open or close a fourth connection between said second plate of said charge transfer capacitor and said second inductive circuit.

48. The DC to DC converter of claim 47 wherein said first switch, said second switch, said third switch and said fourth switch are transistors.

49. The DC to DC converter of claim 47 wherein said first switch and said second switch are transistors, and said third switch and said fourth switch are diodes.

50. The DC to DC converter of claim 46 further comprising at least one control terminal for receiving at least one control signal, said switch circuit operating at a switching frequency in response to said at least one received control signal.

51. The DC to DC converter of claim 46 wherein the components of said converter are fabricated on at least one integrated circuit chip.

52. A processor-based system comprising:
   a processor; and
   an integrated circuit coupled to said processor, at least one of said processor and said integrated circuit containing a DC power converter comprising:
      an input terminal for receiving an input voltage;
      a charging inductor;
      an output terminal for outputting an output voltage different from said input voltage;
      a first capacitor; and
      a switch circuit operating at a switching frequency of at least about 100 MHz for coupling said input terminal to said first capacitor through said charging inductor during a charging phase, said first capacitor being charged during said charging phase,
      said switch circuit coupling said first capacitor to said output terminal during a transfer phase whereby said first capacitor transfers charge to said output terminal.

53. The processor-based system of claim 52 wherein said charging inductor has an inductance value less than about 1 micro Henry.

54. The processor-based system of claim 52 further comprising an output filter connected to said switch circuit and said output terminal whereby said first capacitor transfers charge through said output filter to said output terminal during said transfer phase.

55. The processor-based system of claim 54 wherein said output filter includes at least one output capacitor.

56. The processor-based system of claim 54 wherein said output filter includes at least one output inductor and at least one output capacitor.

57. The processor-based system of claim 52 wherein said switch circuit includes a first switch connected to open or close a first connection between said input terminal and a positive plate of said first capacitor, a second switch connected to open or close a second connection between said positive plate and said output terminal, a third switch connected to open or close a third connection between a negative plate of said first capacitor and a ground potential, and a fourth switch connected to open or close a fourth connection between said negative plate and said input terminal.

58. The processor-based system of claim 57 wherein said first switch, said second switch, said third switch and said fourth switch are transistors.

59. The processor-based system of claim 57 wherein said first switch and said second switch are diodes, and said third switch and said fourth switch are transistors.

60. The processor-based system of claim 52 wherein said switch circuit includes a first switch connected to open or close a first connection between said input terminal and a positive plate of said first capacitor, a second switch connected to open or close a second connection between said positive plate and a ground potential, a third switch connected to open or close a third connection between a negative plate of said first capacitor and said ground potential, and a fourth switch connected to open or close a fourth connection between said negative plate and said output terminal.

61. The processor-based system of claim 60 wherein said first switch, said second switch, said third switch and said fourth switch are transistors.

62. The processor-based system of claim 60 wherein said first switch and said second switch are transistors, and said third switch and said fourth switch are diodes.

63. The processor-based system of claim 52 wherein said input voltage is between about −25 to +25 volts.

64. The processor-based system of claim 52 wherein said input voltage is less than or equal to about +5 volts.

65. The processor-based system of claim 52 wherein said input voltage is greater than or equal to about −5 volts.

66. The processor-based system of claim 52 wherein said charging phase and said transfer phase do not overlap.

67. The processor-based system of claim 52 wherein said charging inductor is an integrated circuit inductor.

68. The processor-based system of claim 52 wherein the converter, excluding said inductor, is fabricated on a single integrated circuit chip.

69. The processor-based system of claim 52 further comprising at least one control terminal for receiving at least one control signal, said switch circuit operating at said switching frequency in response to said at least one received control signal.

70. The processor-based system of claim 52 wherein the components of said converter are fabricated on at least one integrated circuit chip.

71. A processor-based system comprising:
   a processor; and
   an integrated circuit coupled to said processor, at least one of said processor and said integrated circuit containing a DC power converter comprising:
      an input terminal for receiving an input voltage;
      a charging inductor;
      an output terminal for outputting an output voltage different from said input voltage;
      a first capacitor; and
      a switch circuit operating at a switching frequency permitting said charging inductor to have an inductance value less than 1 micro Henry, said switch circuit coupling said input terminal to said first capacitor through said charging inductor during a charging phase, said first capacitor being charged during said charging phase,
      said switch circuit coupling said first capacitor to said output terminal during a transfer phase whereby said first capacitor transfers charge to said output terminal.

72. A method of voltage conversion, comprising the acts of:
   receiving an input voltage from an input terminal;
   outputting an output voltage different from said input voltage to an output terminal;
   charging a first capacitor from said input terminal through a charging inductor during a charging phase;
   transferring charge from said first capacitor to said output terminal during a transfer phase; and
   alternating between said charging phase and said transfer phase at a switching frequency of about at least 100 MHz using a switch circuit, said switch circuit coupling said input terminal to said first capacitor through said charging inductor during said charging phase, and coupling said first capacitor to said output terminal during said transfer phase.

73. The method of claim 72 wherein said charging inductor has an inductance value less than about 1 micro Henry.

74. The method of claim 72 wherein said first capacitor transfers charge during said transfer phase through an output filter connected to said switch circuit and said output terminal.

75. The method of claim 74 wherein said output filter includes at least one output capacitor.

76. The method of claim 74 wherein said output filter includes at least one output inductor and at least one output capacitor.

77. The method of claim 72 wherein said switch circuit includes a first switch connected to open or close a first connection between said input terminal and a positive plate of said first capacitor, a second switch connected to open or close a second connection between said positive plate and said output terminal, a third switch connected to open or close a third connection between a negative plate of said first capacitor and a ground potential, and a fourth switch connected to open or close a fourth connection between said negative plate and said input terminal.

78. The method of claim 77 wherein said first switch, said second switch, said third switch and said fourth switch are transistors.

79. The method of claim 77 wherein said first switch and said second switch are diodes, and said third switch and said fourth switch are transistors.

80. The method of claim 72 wherein said switch circuit includes a first switch connected to open or close a first connection between said input terminal and a positive plate of said first capacitor, a second switch connected to open or close a second connection between said positive plate and a ground potential, a third switch connected to open or close a third connection between a negative plate of said first capacitor and said ground potential, and a fourth switch connected to open or close a fourth connection between said negative plate and said output terminal.

81. The method of claim 80 wherein said first switch, said second switch, said third switch and said fourth switch are transistors.

82. The method of claim 80 wherein said first switch and said second switch are transistors, and said third switch and said fourth switch are diodes.

83. The method of claim 72 wherein said input voltage is between about −25 to +25 volts.

84. The method of claim 72 wherein said input voltage is less than or equal to about +5 volts.

85. The method of claim 72 wherein said input voltage is greater than or equal to about −5 volts.

86. The method of claim 72 wherein said charging phase and said transfer phase do not overlap.

87. The method of claim 72 wherein said charging inductor is an integrated circuit inductor.

88. The method of claim 72 wherein said charging inductor is not an integrated circuit inductor.

89. The method of claim 72 further comprising the acts of receiving at least one control signal and operating said switch circuit at said switching frequency in response to said at least one received control signal.

90. The method of claim 72 wherein conversion is performed by at least one integrated circuit chip.

91. A DC power converter comprising:
   an input terminal for receiving an input voltage;
   a charging inductor;
   an output terminal for outputting an output voltage different from said input voltage;
   a first capacitor; and
   a switch circuit operating at a switching frequency of at least about 100 MHz for coupling said input terminal to said first capacitor through said charging inductor during a charging phase, said first capacitor being charged during said charging phase, said switch circuit coupling said first capacitor to said output terminal and uncoupling said first capacitor from said input terminal during a transfer phase whereby said first capacitor transfers charge to said output terminal;
   wherein said switch circuit includes a first switch connected to open or close a first connection between said input terminal and a first plate of said first capacitor, a second switch connected to open or close a second connection between said first plate and said output terminal, a third switch connected to open or close a third connection between a second plate of said first capacitor and a ground potential, and a fourth switch connected to open or close a fourth connection between said second plate and said input terminal.

92. The DC converter of claim 91 wherein said first switch, said second switch, said third switch and said fourth switch are transistors.

93. The DC converter of claim 91 wherein said first switch and said second switch are diodes, and said third switch and said fourth switch are transistors.

94. A DC power converter comprising:
   an input terminal for receiving an input voltage;
   a charging inductor;
   an output terminal for outputting an output voltage different from said input voltage;
   a first capacitor; and
   a switch circuit operating at a switching frequency of at least about 100 MHz for coupling said input terminal to said first capacitor through said charging inductor during a charging phase, said first capacitor being charged during said charging phase,
   said switch circuit coupling said first capacitor to said output terminal during a transfer phase whereby said first capacitor transfers charge to said output terminal;
   wherein during said charging phase, said switch circuit connects said input terminal to a positive plate of said first capacitor and a negative plate of said first capacitor to a ground potential, and during said transfer phase, said switch circuit connects said negative plate to said input terminal and said positive plate to said output terminal.

95. A DC power converter comprising:
   an input terminal for receiving an input voltage;
   a charging inductor;

an output terminal for outputting an output voltage different from said input voltage;

a first capacitor; and a switch circuit operating at a switching frequency of at least about 100 MHz for coupling said input terminal to said first capacitor through said charging inductor during a charging phase, said first capacitor being charged during said charging phase, said switch circuit coupling said first capacitor to said output terminal during a transfer phase whereby said first capacitor transfers charge to said output terminal;

wherein during said charging phase, said switch circuit connects said input terminal to a positive plate of said first capacitor and a negative plate of said first capacitor to a ground potential, and during said transfer phase, said switch circuit connects said positive plate to said ground potential and said negative plate to said output terminal.

96. A DC power converter comprising:

an input terminal for receiving an input voltage;

a charging inductor;

an output terminal for outputting an output voltage different from said input voltage;

a first capacitor;

a switch circuit operating at a switching frequency of at least about 100 MHz for coupling said input terminal to said first capacitor through said charging inductor during a charging phase, said first capacitor being charged during said charging phase, said switch circuit coupling said first capacitor to said output terminal during a transfer phase whereby said first capacitor transfers charge to said output terminal; and at least a second charging circuit including at least a second capacitor and a second switch circuit connected in parallel with a first charging circuit including at least said first capacitor and said switch circuit, said switch circuits periodically connecting each of said parallel charging circuits to said output terminal.

97. The DC power converter of claim 96 wherein said output terminal is alternately connected periodically to each of said parallel charging circuits at a frequency of at least about 100 MHz.

98. A DC power converter comprising:

an input terminal for receiving an input voltage;

a charging inductor;

an output terminal for outputting an output voltage different from said input voltage;

a first capacitor; and a switch circuit operating at a switching frequency permitting said charging inductor to have an inductance value less than 1 micro Henry, said switch circuit coupling said input terminal to said first capacitor through said charging inductor during a charging phase, said first capacitor being charged during said charging phase, said switch circuit coupling said first capacitor to said output terminal during a transfer phase whereby said first capacitor transfers charge to said output terminal;

wherein said switch circuit includes a first switch connected to open or close a first connection between said input terminal and a positive plate of said first capacitor, a second switch connected to open or close a second connection between said positive plate and said output terminal, a third switch connected to open or close a third connection between a negative plate of said first capacitor and a ground potential, and a fourth switch connected to open or close a fourth connection between said negative plate and said input terminal.

99. The DC converter of claim 98 wherein said first switch, said second switch, said third switch and said fourth switch are transistors.

100. The DC converter of claim 98 wherein said first switch and said second switch are diodes, and said third switch and said fourth switch are transistors.

101. A DC power converter comprising:

an input terminal for receiving an input voltage;

a charging inductor;

an output terminal for outputting an output voltage different from said input voltage;

a first capacitor; and a switch circuit operating at a switching frequency permitting said charging inductor to have an inductance value less than 1 micro Henry, said switch circuit coupling said input terminal to said first capacitor through said charging inductor during a charging phase, said first capacitor being charged during said charging phase, said switch circuit coupling said first capacitor to said output terminal during a transfer phase whereby said first capacitor transfers charge to said output terminal;

wherein during said charging phase, said switch circuit connects said input terminal to a positive plate of said first capacitor and a negative plate of said first capacitor to a ground potential, and during said transfer phase, said switch circuit connects said negative plate to said input terminal and said positive plate to said output terminal.

102. A DC power converter comprising:

an input terminal for receiving an input voltage;

a charging inductor;

an output terminal for outputting an output voltage different from said input voltage;

a first capacitor; and a switch circuit operating at a switching frequency permitting said charging inductor to have an inductance value less than 1 micro Henry, said switch circuit coupling said input terminal to said first capacitor through said charging inductor during a charging phase, said first capacitor being charged during said charging phase, said switch circuit coupling said first capacitor to said output terminal during a transfer phase whereby said first capacitor transfers charge to said output terminal;

wherein during said charging phase, said switch circuit connects said input terminal to a positive plate of said first capacitor and a negative plate of said first capacitor to a ground potential, and during said transfer phase, said switch circuit connects said positive plate to said ground potential and said negative plate to said output terminal.

103. A DC power converter comprising:

an input terminal for receiving an input voltage;

a charging inductor;

an output terminal for outputting an output voltage different from said input voltage;

a first capacitor; and a switch circuit operating at a switching frequency permitting said charging inductor to have an inductance value less than 1 micro Henry, said switch circuit coupling said input terminal to said first capacitor through said charging inductor during a charging phase, said first capacitor being charged during said charging phase, said switch circuit coupling said first capacitor to said output terminal during a transfer phase whereby said first capacitor transfers charge to said output terminal;

wherein said charging phase and said transfer phase do not overlap.

104. A DC power converter comprising:

an input terminal for receiving an input voltage;

a charging inductor;

an output terminal for outputting an output voltage different from said input voltage;

a first capacitor;

a switch circuit operating at a switching frequency permitting said charging inductor to have an inductance value less than 1 micro Henry, said switch circuit coupling said input terminal to said first capacitor through said charging inductor during a charging phase, said first capacitor being charged during said charging phase, said switch circuit coupling said first capacitor to said output terminal during a transfer phase whereby said first capacitor transfers charge to said output terminal; and at least a second charging circuit including at least a second capacitor and a second switch circuit connected in parallel with a first charging circuit including at least said first capacitor and said switch circuit, said switch circuits periodically connecting each of said parallel charging circuits to said output terminal.

105. The DC power converter of claim 104 wherein said output terminal is alternately connected periodically to each of said parallel charging circuits at a frequency of at least about 100 MHz.

106. A DC to DC converter, comprising:

a charge transfer capacitor;

a terminal for receiving a DC source voltage;

a ground connection;

a first inductive circuit coupled to said terminal;

a second inductive circuit;

an output capacitor coupled between said second inductive circuit and said ground connection;

a switch circuit operative in a first mode to couple said terminal through said first inductive circuit to a first plate of said charge transfer capacitor and to couple said ground connection to a second plate of said charge transfer capacitor to enable said charge transfer capacitor to be charged by a DC voltage applied to said terminal, said switch circuit being operative in a second mode to couple said first plate of said charge transfer capacitor to said second inductive circuit and to couple said second plate of said charge transfer capacitor to said terminal to enable said output capacitor to be charged by an additive DC voltage formed by a DC voltage at said terminal and a DC voltage on said charge transfer capacitor;

wherein said switch circuit includes a first switch connected to open or close a first connection between said first inductive circuit and said first plate of said charge transfer capacitor, a second switch connected to open or close a second connection between said first plate of said charge transfer capacitor and said second inductive circuit, a third switch connected to open or close a third connection between said second plate of said charge transfer capacitor and said ground connection, and a fourth switch connected to open or close a fourth connection between said second plate of said charge transfer capacitor and said terminal.

107. The DC to DC converter of claim 106 wherein said first switch, said second switch, said third switch and said fourth switch are transistors.

108. The DC to DC converter of claim 106 wherein said first switch and said second switch are diodes, and said third switch and said fourth switch are transistors.

* * * * *

UNITED STATES PATENT AND TRADEMARK OFFICE
CERTIFICATE OF CORRECTION

PATENT NO.   : 6,429,632 B1
DATED        : August 6, 2002
INVENTOR(S)  : Leonard Forbes et al.

Page 1 of 1

It is certified that error appears in the above-identified patent and that said Letters Patent is hereby corrected as shown below:

Column 2,
Line 11, "$(1x10^{-6}.H)$" should read -- $(1x10^{-6}H)$ --.

Column 9,
Line 2, "arc" should read -- are --.

Signed and Sealed this

Third Day of December, 2002

JAMES E. ROGAN
*Director of the United States Patent and Trademark Office*